(12) United States Patent
Quinlan et al.

(10) Patent No.: US 9,356,994 B2
(45) Date of Patent: May 31, 2016

(54) METHOD OF OPERATING A COMPUTING DEVICE, COMPUTING DEVICE AND COMPUTER PROGRAM

(71) Applicant: Good Technology Corporation, Dover, DE (US)

(72) Inventors: Sean Michael Quinlan, Duvall, WA (US); Kevin Charles Lohman, Sunnyvale, CA (US); Haniff Somani, Mercer Island, WA (US); Peter Maximilian Barker, Flower Mound, TX (US)

(73) Assignee: Good Technology Corporation, Sunnyvale, CA (US)

( * ) Notice: Subject to any disclaimer, the term of this patent is extended or adjusted under 35 U.S.C. 154(b) by 0 days.

(21) Appl. No.: 13/780,245

(22) Filed: Feb. 28, 2013

(65) Prior Publication Data

US 2013/0227287 A1  Aug. 29, 2013

Related U.S. Application Data

(60) Provisional application No. 61/604,898, filed on Feb. 29, 2012.

(51) Int. Cl.
*H04L 29/06* (2006.01)
*H04L 29/08* (2006.01)
*G06F 21/62* (2013.01)
(Continued)

(52) U.S. Cl.
CPC ............ *H04L 67/10* (2013.01); *G06F 21/6218* (2013.01); *G06F 21/88* (2013.01); *H04L 63/06* (2013.01); *H04L 67/025* (2013.01); *H04W 12/06* (2013.01); *H04W 12/08* (2013.01); *H04L 63/102* (2013.01)

(58) Field of Classification Search
None
See application file for complete search history.

(56) References Cited

U.S. PATENT DOCUMENTS 6,098,056 A   8/2000   Rusnak et al.
6,219,423 B1  4/2001   Davis
(Continued)

FOREIGN PATENT DOCUMENTS

CA   2553081 A1    1/2008
WO   2004015576 A1 2/2004
(Continued)

OTHER PUBLICATIONS

International Search Report and Written Opinion of the International Searching Authority Issued May 10, 2013 in PCT/US13/27972.
(Continued)

*Primary Examiner* — Hadi Armouche
*Assistant Examiner* — Andrew Steinle
(74) *Attorney, Agent, or Firm* — Fish & Richardson P.C.

(57) ABSTRACT

Data is stored on a computing device in encrypted form in respective digital containers. At least one data access application is stored on the computing device. A control application of the computing device connects to a remote control center. A command from the remote control center is received at the connected control application. The command contains an action to be taken in respect of at least one of the at least one data access application and the containers stored on the computing device. The command is passed from the connected control application to the data access application or container, and the data access application or container carries out the command.

16 Claims, 5 Drawing Sheets

(51) Int. Cl.
  *G06F 21/88* (2013.01)
  *H04W 12/06* (2009.01)
  *H04W 12/08* (2009.01)

(56) References Cited

U.S. PATENT DOCUMENTS

| | | | |
|---|---|---|---|
| 6,272,631 | B1 | 8/2001 | Thomlinson |
| 7,302,570 | B2 | 11/2007 | Beard et al. |
| 7,591,012 | B2 | 9/2009 | Jaganathan et al. |
| 7,869,591 | B1 | 1/2011 | Nagel et al. |
| 7,945,944 | B2 | 5/2011 | Burton et al. |
| 2002/0047892 | A1 | 4/2002 | Gonsalves, Jr. |
| 2005/0086501 | A1* | 4/2005 | Woo et al. ............ 713/189 |
| 2005/0182966 | A1 | 8/2005 | Pham et al. |
| 2006/0143453 | A1 | 6/2006 | Imamoto et al. |
| 2006/0143468 | A1 | 6/2006 | Richards, Jr. et al. |
| 2006/0195689 | A1 | 8/2006 | Blecken et al. |
| 2007/0014403 | A1 | 1/2007 | Loo et al. |
| 2007/0033397 | A1* | 2/2007 | Phillips, II et al. ......... 713/168 |
| 2008/0244270 | A1 | 10/2008 | Zimmels et al. |
| 2009/0202078 | A1 | 8/2009 | Bar-El et al. |
| 2009/0249492 | A1* | 10/2009 | Boesgaard Sorensen ...... 726/27 |
| 2009/0259850 | A1 | 10/2009 | Ishibashi |
| 2009/0262926 | A1 | 10/2009 | Kabra et al. |
| 2010/0061555 | A1 | 3/2010 | Ducharme et al. |
| 2010/0131996 | A1* | 5/2010 | Gauld ............ 725/100 |
| 2010/0235624 | A1 | 9/2010 | Candelore |
| 2013/0117579 | A1 | 5/2013 | Ham |

FOREIGN PATENT DOCUMENTS

| | | |
|---|---|---|
| WO | 2006125112 A2 | 11/2006 |
| WO | 2008086611 A1 | 7/2008 |

OTHER PUBLICATIONS

Dmitry Kasatkin. "Mobile Simplified Security Framework". Proceedings of the Linum Symposium, Jul. 13, 2010. Ottawa, Ontario Canada.

Aa Vv: "Is MfE (Activesync) provisioning in MeeGo?—maemo.org—Talk". http://talk.maemo.org/showthread.php? t=75065 Jul. 19, 2011.

* cited by examiner

Fig. 5

METHOD OF OPERATING A COMPUTING DEVICE, COMPUTING DEVICE AND COMPUTER PROGRAM

CROSS REFERENCE TO RELATED APPLICATION

This application claims the benefit of U.S. provisional patent application No. 61/604,898, filed on Feb. 29, 2012, the entire content of which is incorporated herein by reference.

TECHNICAL FIELD

The present invention relates to a method of operating a computing device, a computing device and a computer program.

BACKGROUND

There are many situations where it is desirable or necessary to encrypt data when the data is stored and/or transmitted, principally in order to prevent unauthorized access to the data. A number of different methods and techniques for encrypting data are known. Some of these make use of a "container" concept: the data is encrypted and "wrapped" in a (digital) container for which various access policies can be applied to control which users can access the (encrypted) data within the container and under what circumstances. A container is a meta-file format whose specification describes how different data elements and metadata coexist in a computer file. The encryption key which is used to encrypt (and, correspondingly, decrypt) the data may itself be encrypted for secure storage purposes, typically in the prior art by using a user-entered password as an encryption key for that encryption.

Data can be sent in an encrypted form over some kind of transmission system, including for example one or more of wireless and wired connections, local and wide area networks, the Internet, cellular (mobile) telephone systems, etc. The data may be sent between user devices or may be uploaded to or downloaded from some central server or servers, such as at a user's workplace.

However, a problem with encrypting data is making it easily accessible to users. This is a particular problem where the user is using a mobile device, including for example a wireless device such as a so-called smart phone or a tablet computer or the like, or other devices of relatively low computing power, including devices that connect to a network with wired connections, as such devices may have relatively limited amounts of storage and functionality. A particular example is enabling users to have a secure way of viewing and/or editing data or files in general, or carrying out other actions in respect of the data or files including for example other manipulation, transformation, processing, storage, transmission and other computing operations. Such files may have been downloaded or received at the user device as an attachment to an email or by some other file transfer protocol or method. Since a container may contain many files, this can give rise to problems as many different types of files are typically stored and each different type of file requires different application code to view/edit/manipulate/etc, so the container application becomes larger the more different types of files it supports. It is desirable to make the encrypted file available to third party applications on the user device, such as viewers/editors/etc., though this availability must be achieved in a secure manner which does not compromise the security of the encrypted file.

Another issue that may arise in practice is that the secure containers on a user device may need to be updated from time to time in certain respects. For example, there may be some central control center which manages the user devices and at least some of the files that are stored on the user devices. The central control center may for example want to amend certain access policies or the like for one or more of the files in the containers, or delete the containers or the file(s) within them, perhaps because the user device has been lost or stolen. However, it may be that some of the containers on the user device effectively only connect to the central control center rarely or never and thus it may be difficult in practice to update access polices or the like, or delete the files, for all of the containers concerned on the user device in a timely fashion.

Another issue that arises is the matter of how to generate encryption keys that are to be used to encrypt and decrypt data. This is a particular issue where there are several applications running on a computing device that require access to or store data in encrypted form. This includes the case above where there are several applications such as viewers/editors/ etc. on the computing device that access and/or store data in encrypted form. It is inconvenient for a user to have to enter a password each time that a particular application accesses data on a user device, but it is also preferred not to use the same encryption key for each application for security reasons.

Various aspects of the present invention are directed to overcoming one or more of the problems set out above.

SUMMARY

According to a first aspect of the present invention, there is provided a method of operating a computing device, the computing device having data stored thereon in encrypted form in respective digital containers and having at least one data access application stored thereon, the method comprising: connecting a control application of the computing device to a remote control center; receiving at said connected control application a command from a said remote control center, the command containing an action to be taken in respect of at least one of: the at least one data access application and the containers stored on the computing device; passing the command from said connected control application to said data access application or container; and said data access application or container carrying out the command.

Examples of embodiments of this aspect enable timely passing of commands to data access applications and/or containers on a computing device even if those data access applications and containers do not themselves connect to the remote control center.

In an embodiment, the command contains an action to be taken in respect of the at least one data access application, the method comprising said control application causing said data access application to execute in order to carry out the command.

In an embodiment, the or each data access application is unable to connect directly to the remote control server. If for example the or each data access application delegates user authentication to the control application and the control application alone proxies actions and policies to them during each such user authentication exchange, frequent communication between the control application and the remote control center is made more likely, helping to ensure a timely passing on of the actions and policies to the intended destination.

In an embodiment, the command is encrypted using an encryption key. In an embodiment, the encryption key is a shared secret key of a Diffie-Hellman key exchange, a public key of a public/private key pair sent by the control application to the data access application, or a symmetric session key negotiated between the control application and the data access application during an initial handshake. This provides a secure and convenient way of negotiating the encryption key. In addition, to increase the security of the key exchange, each key exchange message may be authenticated as originating from the expected application by inspecting the source application identifier of the message, in operating system environments that supply such identifiers with inter-process communication messages.

In an embodiment, the data access application enables at least one of viewing, editing, manipulation, transformation, processing, storage and transmission of the data.

According to a second aspect of the present invention, there is provided a computing device having data stored thereon in encrypted form in respective digital containers and having at least one data access application stored thereon, the computing device comprising a processing system constructed and arranged to cause the computing device to: connect a control application of the computing device to a remote control center; and pass a command, received at said connected control application from a remote control center for at least one of: the at least one data access application and the digital containers stored on the computing device, to said data access application or container, the command containing an action to be taken in respect of said data access application or container; whereby said data access application or container carries out the command.

The processing system may comprise at least one processor and at least one memory including computer program code, the at least one memory and the computer program code being configured to, with the at least one processor, cause the computing device to operate as described above.

According to a third aspect of the present invention, there is provided a non-transitory computer-readable storage medium comprising code stored thereon such that when the code is executed on a computing device having data stored thereon in encrypted form in respective digital containers and having at least one data access application stored thereon, the computing device is arranged to: connect a control application of the computing device to a remote control center; and pass a command, received at said connected control application from a remote control center for at least one of: the at least one data access application and the digital containers stored on the computing device, to said data access application or container, the command containing an action to be taken in respect of said data access application or container; whereby said data access application or container carries out the command.

Further features and advantages of the invention will become apparent from the following description of preferred embodiments of the invention, given by way of example only, which is made with reference to the accompanying drawings.

DETAILED DESCRIPTION

Figure 1:
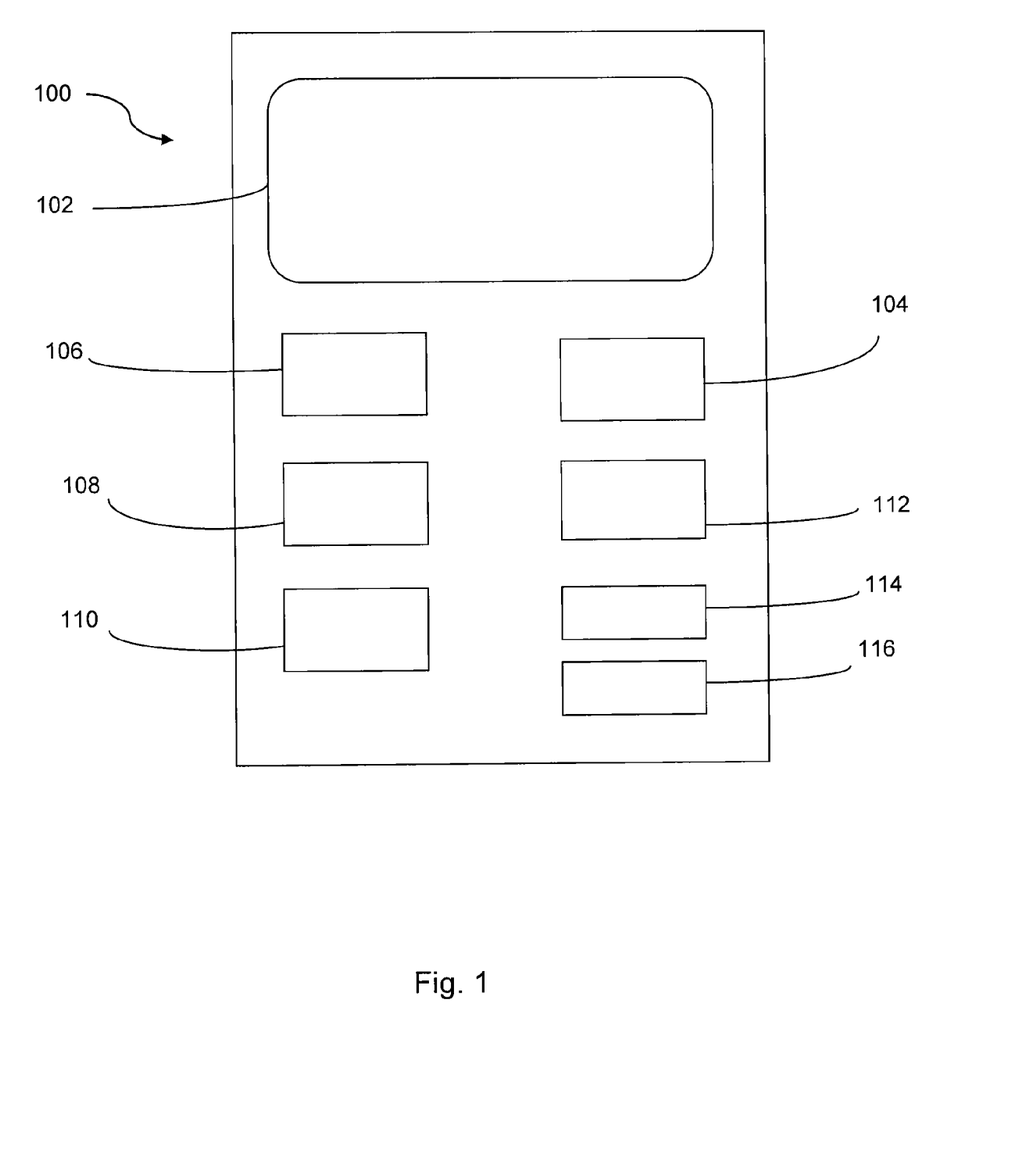
FIG. 1 shows schematically components of an example of a computing device according to and suitable for practicing embodiments of the present invention.

FIG. 1 shows schematically components of an example of a computing device 100. The example shown is a client or user device 100. A particular example is a portable computing device 100 though embodiments of the present invention are equally applicable to non-portable computing devices, including for example desktop computers, kiosk style computers, etc. In either case, for portable or non-portable computing devices, the device 100 may connect to some kind of network via wired or wireless connections or a combination of wired and wireless connections. A portable computing device 100 may take the form of a smart phone, a personal digital assistant (PDA), an e-reader, a tablet or notebook computer, etc.

The computing device 100 includes a display screen 102, which may be a touch screen which can receive user input and/or the computing device 100 may have a separate input device such as a keyboard 104 or some pointing device (not shown), which may be integral or connected wirelessly or by wired connection to the computing device 100. The computing device 100 further includes a processor 106, a non-volatile storage device 108 (such as a hard disk drive and/or non-volatile memory for example) and a random access memory (RAM) 110. The processor 106 processes instructions stored in the random access memory 110 that have been loaded from the non-volatile storage device 108. These instructions are in the form of computer software in the form of one or more programs that implement an operating system and a client program. The RAM 110 is also used by programs running on the processor 106 as a means of storing and accessing data in the form of electronic signals where the data is used during the execution of the programs. The operating system provides a file system for storing, modifying and accessing files held in the non-volatile storage device 108. This file system may be accessible to other programs running on the processor 106 via the programmatic interface provided by the operating system. Programs running on the processor 102 also process user input obtained from a user input, whether via the touch screen 102 or keyboard 104, etc. The computing device 100 also includes a network interface 112 (or a plurality of such interfaces) which allows programs running on the processor 102 to transmit and receive data to and from other devices and systems via a communications network (or a plurality of such networks), via wired and/or wireless connections.

Figure 2:
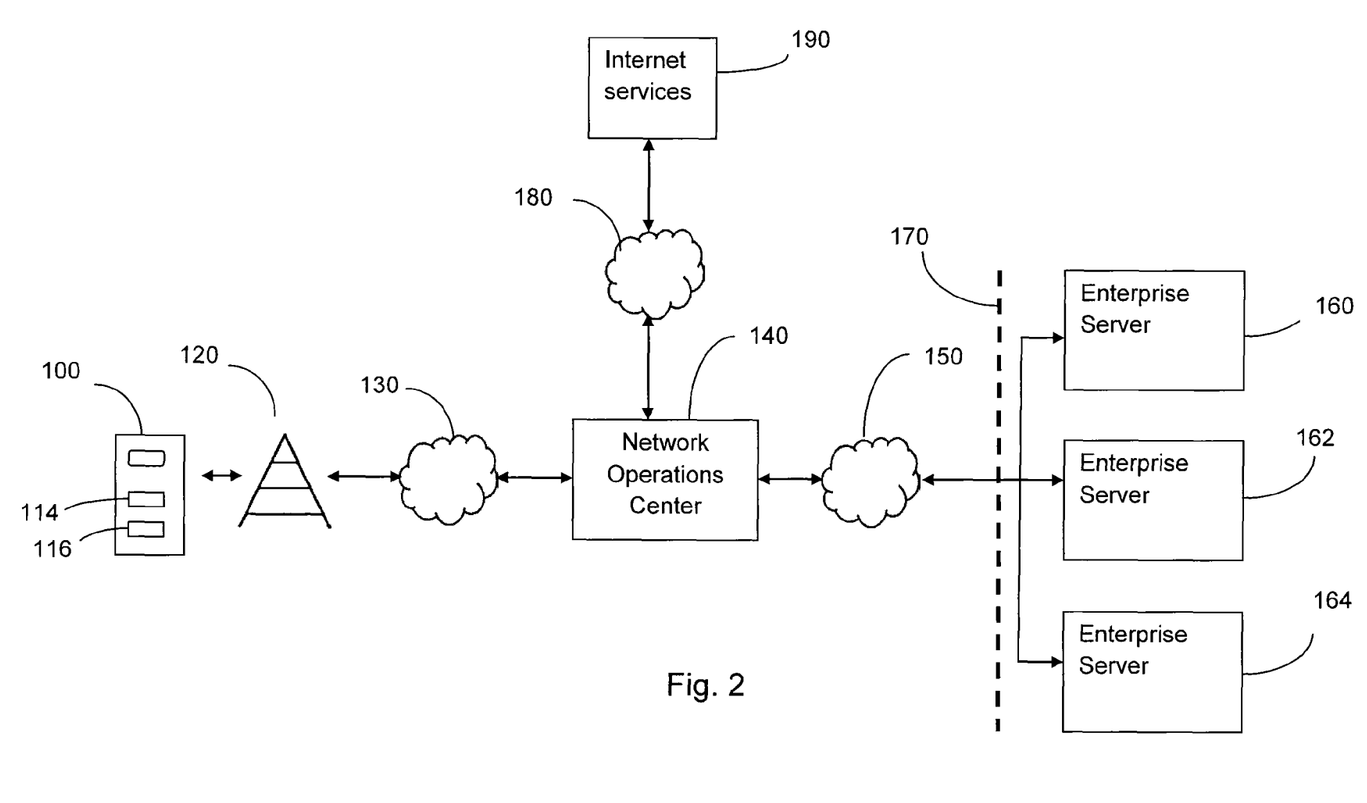
FIG. 2 shows schematically an example of network components and devices for embodiments of the present invention.

Examples of communication links which may be made by the computing device 100 using the network interface 112 are shown schematically in FIG. 2. The network interface 112 may include a radio access network interface which is able to communicate with a wireless access node 120, such as a base station or a wireless access point, which provides access to a communications network 130. The network interface 112 may be able to connect to the wireless access node 120 using one or more of a number of radio access technologies, including for example Global System for Mobile Communications (GSM), Universal Mobile Telecommunications System (UMTS), Long Term Evolution (LTE), and fixed wireless access (such as IEEE 802.16 WiMax), and wireless networking (such as IEEE 802.11 WiFi). Alternatively or additionally, the network interface 112 may provide for wired connections to the communications network 130, such as via a modem or router or the like. The communications network 130 may be or include the Internet and/or a public land mobile network (PLMN) and/or a public switched telephone network (PSTN).

The computing client device 100 may include a networking program that allows communication between programs running on the processor 106 and external apparatus via the communications network 130. External devices which can be communicated with via the communications network 130 may include a remote data processing device apparatus such as a Network Operations Center (NOC) 140. The NOC 140 may be a computer server or a plurality of computer servers which can communicate via a communications network 150 with other remote data processing devices, such as one or more enterprise servers 160, 162, 164 which are connected to an enterprise network (not shown). The communications network 150 may for example be or include the Internet, a PLMN, a PSTN, etc. General access to the one or more enterprise servers 160, 162, 164 and the enterprise network from the communications network 150 may typically be prevented by a firewall 170 placed between the communications network 150 and the enterprise network such that all network traffic that passes between the communications network 150 and the enterprise network can be monitored and (optionally) discarded if it does not satisfy criteria enforced by the firewall 170. For example the firewall 170 may be configured to only allow network connections between the NOC 140 and one or more enterprise servers 160, 162, 164, and to discard all other network connections from the communications network 150 to the one or more enterprise servers 160, 162, 164 and/or the enterprise network.

In order to access content and services provided by remote data processing devices such as the NOC 140 and one or more enterprise servers 160, 162, 164, a user of the computing device 100 may use a client program 114 on the computing device 100. The client program 114 may for example be pre-loaded onto the computing device 100 before purchase of the computing device 100 by the user or downloaded and installed onto the computing device 100 by the user subsequently. The one or more enterprise servers 160, 162, 164 may provide access to enterprise services including enterprise email services for storing, sending and receiving email; enterprise file sharing services for storing and retrieving files; enterprise database services for accessing and modifying an enterprise database (or databases); enterprise personal information management (PIM) services for accessing and modifying personal information such as contact lists, calendars, task lists; and other services including enterprise resource planning, customer relationship management, field/support force automation, consumer data content storage, etc. Each of these services may be provided by the one or more enterprise servers 160, 162, 164 and/or by one or more other servers within the enterprise network to which the one or more enterprise servers 160, 162, 164 may connect in order to provide access to those services. In order to access these services, the user of the client program 114 is first identified and authenticated by the NOC 140 and/or one or more enterprise servers 160, 162, 164, by the user entering some identification and authentication details. Once the user has entered the identification and authentication details, they may be transmitted from the computing device 100 to the NOC 140 over a secure (e.g. encrypted) data connection established over the (relatively insecure) communications network 130. Once the user has been identified and authenticated by the NOC 140, the client program 114 may maintain a data connection between it and the NOC 140 in order to allow communication between the client program 114 and the NOC 140. This data connection may be a secure connection over the data communications network 130 and allows data to be sent between the computing device 100 and the one or more enterprise servers 160, 162, 164. Thus the NOC 140 may act as a relay between the client program 114 and the one or more enterprise servers 160, 162, 164 and assists in ensuring secure transfer of data between the computing device 100 and the one or more enterprise servers 160, 162, 164. The data connection between the client program 114 and the NOC 140 may also be used to "push" information received from the one or more enterprise servers 160, 162, 164 to applications running on the computing device 100. The network interface of the NOC 140 may also allow the NOC 140 to communicate via a communications network 180 (including for example the Internet) with other remote data processing devices such as one or more third party computer servers 190 that provide other services. It should be noted that whilst much of the above is in terms of "enterprise" servers providing enterprise services for users, embodiments of the present invention are widely applicable to many scenarios where a user or client device 100 connects to some remote data store or other server over a network. Moreover, in addition, the client device 100 can connect directly to third party computer servers 190 without having to connect via the NOC 140, again via wired or wireless or a combination of wired and wireless connections, including for example via the Internet.

At least some of the data stored on the computing device 100, such as data that is obtained via the NOC 140, is stored in secure, encrypted form. As mentioned above, a number of different methods and techniques for encrypting data are known. In the present example, the encryption makes use of a (digital) container in which the data is encrypted and "wrapped" in a container for which various access policies can be applied to control which users can access the (encrypted) data within the container. The access policies can for example be determined, and varied if desired, by a remote user, such as an administrator of the one or more enterprise servers 160, 162, 164. Changes to the access policies can be communicated to the computing device 100 via the NOC 140.

Typically, the computing device 100 will include one or more programs or applications that allow various actions to be carried out in respect of the data or files on the computing device 100, including for example viewing, editing, other manipulation, transformation, processing, storage, transmission and other computing operations. For brevity, a particular example discussed in this specification is that of the computing device 100 comprising one or more secure viewer/editor applications 116 which can be used to view and/or edit data that is stored in secure form on the computing device 100, the data typically being stored in the form of computer files. It will be understood however that this is only one specific example of an application that carry out actions in respect of data or files on the computing device 100 and that aspects of the present invention are applicable broadly to other such applications. In general terms, in one example, this operates as follows. It should be noted that there may in practice be several different secure viewer/editor or other applications 116 installed on the computing device 100. However, again for simplicity, the following description will principally be in respect of there being just one secure viewer/editor application 116.

As discussed further below, the secure viewer/editor application 116 has to obtain a data or file access application key from the client program 114 running on the computing device 100 in order to be able to unlock files stored in encrypted form in secure storage on the computing device 100 for that secure viewer/editor application 116. Requests and other messages passed from the client program 114 to the secure viewer/editor application 116 are authenticated as originating from the client program 114. Conversely, requests and other messages passed from the secure viewer/editor application 116 to the client program 114 are authenticated as originating from a supported secure viewer/editor application. These authentications may be based on some identifier of the requesting application or program that is sending the request. Moreover, all inter-container communications between the client program 114 and the secure viewer/editor application 116 (whether they be requests for access to files for example, or transfers of files themselves) are encrypted for security purposes, for example to stop some "eavesdropping" application which may be running on the computing device 100 being able to intercept and interpret the communications, access the files, etc. (Such an eavesdropping application may be a legitimate function of the operating system of the device, but is nevertheless undesirable in this context where security of the data is paramount.) To enable this encryption, in one embodiment the client program 114 and the secure viewer/editor application 116 exchange an "Inter-container Transport" key which is used for subsequent communication, optionally subject to a key-rotation interval. The client program 114 randomly generates an Inter-container Transport Key for each secure viewer/editor application 116 and retains these keys in secure storage. Thus, if there are plural secure viewer/editor applications 116, the client program 114 is therefore effectively "paired" separately with each of the secure viewer/editor applications 116, each pairing having its own key. In this way, the secure viewer/editor application 116 need not call back to the client program 114 to obtain the Inter-container Transport key after every file/policy push for example, but only when it does not currently have cached in memory an Inter-container Transport key matching the keyID indicated in the request.

It should be noted that the requests used to share or obtain the Inter-container Transport key cannot themselves be encrypted with this key. Thus, in one embodiment all requests that are not encrypted with the Inter-container Transport key are made part of a request-pair in which an encryption key is negotiated or exchanged on-the-fly between the client program 114 and the secure viewer/editor application 116. A number of key exchange methods may be used for this purpose. One embodiment for this uses the "anonymous Diffie-Hellman key exchange" algorithm, though a preferred embodiment uses the more secure "elliptic curve Diffie-Hellman key exchange" algorithm. These algorithms require only one message to be sent from each endpoint (the client program 114 and the secure viewer/editor application 116 respectively in this example) to complete the exchange. These Diffie-Hellman key exchange methods are known in themselves and allow two parties which have no prior knowledge of each other to jointly establish a shared secret key over an insecure communications channel. This key can then be used to encrypt subsequent communications using a symmetric key cipher. In outline, the basic Diffie-Hellman key exchange algorithm operates as follows:

1. Alice and Bob agree to use a prime number p and a number g that is a primitive root mod p.
2. Alice chooses a secret integer a, and then sends Bob $A=g^a \bmod p$
3. Bob computes $s=A^b \bmod p$
4. Bob chooses a secret integer b, then sends Alice $B=g^b \bmod p$
5. Alice computes $s=B^a \bmod p$
6. Alice and Bob now share a secret "s" (given that $A^b \bmod p = B^a \bmod p = s$)

An important advantage of this approach is that only one message in each direction is required in order to establish a shared key s, which in this example is used to encrypt requests for the Inter-container Transport key which is subsequently used for encrypting subsequent communications between the client program 114 and the secure viewer/editor application 116. In addition, assuming the messages are ordered as in the outline above, "Bob" (i.e. the client program 114 or the secure viewer/editor application 116 as the case may be) may additionally include data encrypted with the shared secret s (i.e. the shared encryption key) in the message of step 4, which saves time and processing that would otherwise be involved with sending a separate message to include encrypted data after the shared encryption key has been exchanged. It should be noted that p and g may be made public. Only a, b, and s must be kept secret. The Elliptic Curve Diffie-Hellman is a variant of the Diffie-Hellman key exchange algorithm discussed above which uses elliptic curve cryptography and is in general more secure and more efficient in terms of speed and size of the exchanged key, though operates using the same basic principles and method. In this specification, these two methods are referred to generically as the Diffie-Hellman key exchange unless the context requires otherwise.

Thus, here, if it does not already have an Inter-container Transport key for encrypting messages to be sent to and received from the client program 114, or the current Inter-container Transport key has expired for example, in one embodiment the secure viewer/editor application 116 initiates a Diffie-Hellman key exchange with the client program in order to obtain a shared encryption key. The client program 114 can then send an Inter-container Transport key to the secure viewer/editor application 116 in encrypted form using that shared encryption key, that Inter-container Transport key being used to encrypt subsequent exchanges between the client program 114 and the secure viewer/editor application 116.

As an alternative or in addition to obtaining an Inter-container Transport key for encrypting messages to be sent to and received from the client program 114 as described above, the secure viewer/editor application 116 (or other application) and the client program 114 may each generate a public/private key pair, with the respective public keys being used to encrypt subsequent messages sent between the applications and the respective private keys being used to sign said messages, or with the respective certificates being used to secure subsequent TLS (Transport Layer Security) connections between the applications, as described below. For an initial pairing between the secure viewer/editor application 116 and the client program 114, each application sends a certificate containing its own public key to the other application. During subsequent TLS connections between the secure viewer/editor application 116 and the client program 114, the application initiating the connection authenticates the application to which it is connecting by verifying that the certificate provided during an initial handshake matches the certificate previously obtained from the other application. Likewise, the application accepting the incoming connection authenticates the application that is connecting to it by verifying that the client certificate provided during the handshake matches the certificate previously obtained from the other application. In such a case, as discussed further below, a symmetric session key may be negotiated during the initial handshake between the applications, the session key being used in encrypting subsequent communications between the applications.

The secure viewer/editor application 116, rather than prompting the user directly for a client password to allow it to generate a key to access encrypted files, preferably relies on the client program 114 to authenticate the local user. This "single-sign-on" element allows the user to unlock the client program 114 and all associated secure viewer/editor applications 116 simultaneously by entering a single user-selected client password in the user interface of the client program 114, which is more convenient for the user.

Thus, whenever started or restarted, each secure viewer/editor application 116 requests its own "client password" or file access application key from the client program 114 in order to be able to unlock files stored in encrypted form in its own secure storage. This file access application key is generated by the client program 114 specifically for the secure viewer/editor application 116 and for example does not match the user-selected password which is used by the user to access the client program 114 itself. When the client program 114 first receives such a request from a given secure viewer/editor application 116 (for example when the secure viewer/editor application 116 is first launched or started on the computing device 100), it generates an application key for the application and also stores the key for future retrieval. If the client program 114 receives such a request and is already unlocked (i.e. is running and has already been opened using the user-selected password for the client program 114), it responds by sending the appropriate file access application key to the secure viewer/editor application 116. If it is not already unlocked, the client program 114 prompts the user to enter the user-selected password for the client program 114, and then, after entry of the correct user-selected password for the client program 114, responds to the secure viewer/editor application 116 with the file access application key for that secure viewer/editor application 116. In keeping with the above, the transmission of that file access application key is encrypted, for example using the shared secret key of a Diffie-Hellman key exchange or the public key of a public/private key pair as discussed above.

Once the secure viewer/editor application 116 obtains its file access application key from the client program 114, the file access application key is used to derive a key that is used to encrypt/decrypt the master database key which is used to encrypt/decrypt data on the computing device 100. To restate this, for added security, the data on the computing device 100 is encrypted using a master database key, and that master database key is itself encrypted using the file access application key for the (or that particular) secure viewer/editor application 116 and stored in this encrypted form in a data store on the computing device 100 for the (or that particular) secure viewer/editor application 116. That encrypted master key can be accessed and decrypted by the secure viewer/editor application 116 using the file access application key as and when needed so that the secure viewer/editor application 116 can, in turn, then decrypt the data. The encryption for the data itself may use any suitable encryption technique. A particularly suitable example is AES-CBC (Advanced Encryption Standard cipher algorithm in Cipher Block Chaining mode) using for example a random 192 bit key as the master database key.

Since the secure viewer/editor application 116 is dependent on the client program 114 for the file access application key that unlocks its own local data store, it is preferred that the file access application key is not simply a string that is randomly generated by the client program 114 and stored only in the local database of the client program 114. If this were the case, then uninstallation/reinstallation of the client program 114 would typically result in a loss of access to all data previously stored with any such viewer/editor applications 116. Therefore, it is preferred that the file access application key be recoverable remotely and independently of the client device 100 and the client program 114 in particular.

A particularly useful way to achieve this is to make the file access application key recoverable from information that can be stored remotely from the client device 100. (A particularly suitable location is for example one of the enterprise servers 160,162,164 behind the firewall 170 mentioned above or some other remote data store.) In addition, since the file access application key is ideally recoverable in the case that a device record is deleted from the remote data store and then the client device 100 is re-provisioned, this file access application key information is preferably stored at the remote data store in records associated with a unique ID for the client device 100 and/or the enterprise user ID. Another factor that is preferably taken into account is that the secure viewer/editor application 116 may be first used at a time when the client program 114 is out of coverage of the NOC 140 or other remote data store (perhaps because no network connection for the client device 100 is available for example) and the client program 114 could be uninstalled before it subsequently comes back into coverage. Thus, recovery of the secure viewer/editor application 116 file access application key preferably does not depend on the ability of the client program 114 to synchronize information with the remote data store at any time other than when the client program 114 is initially activated or is reactivated.

Figure 3:
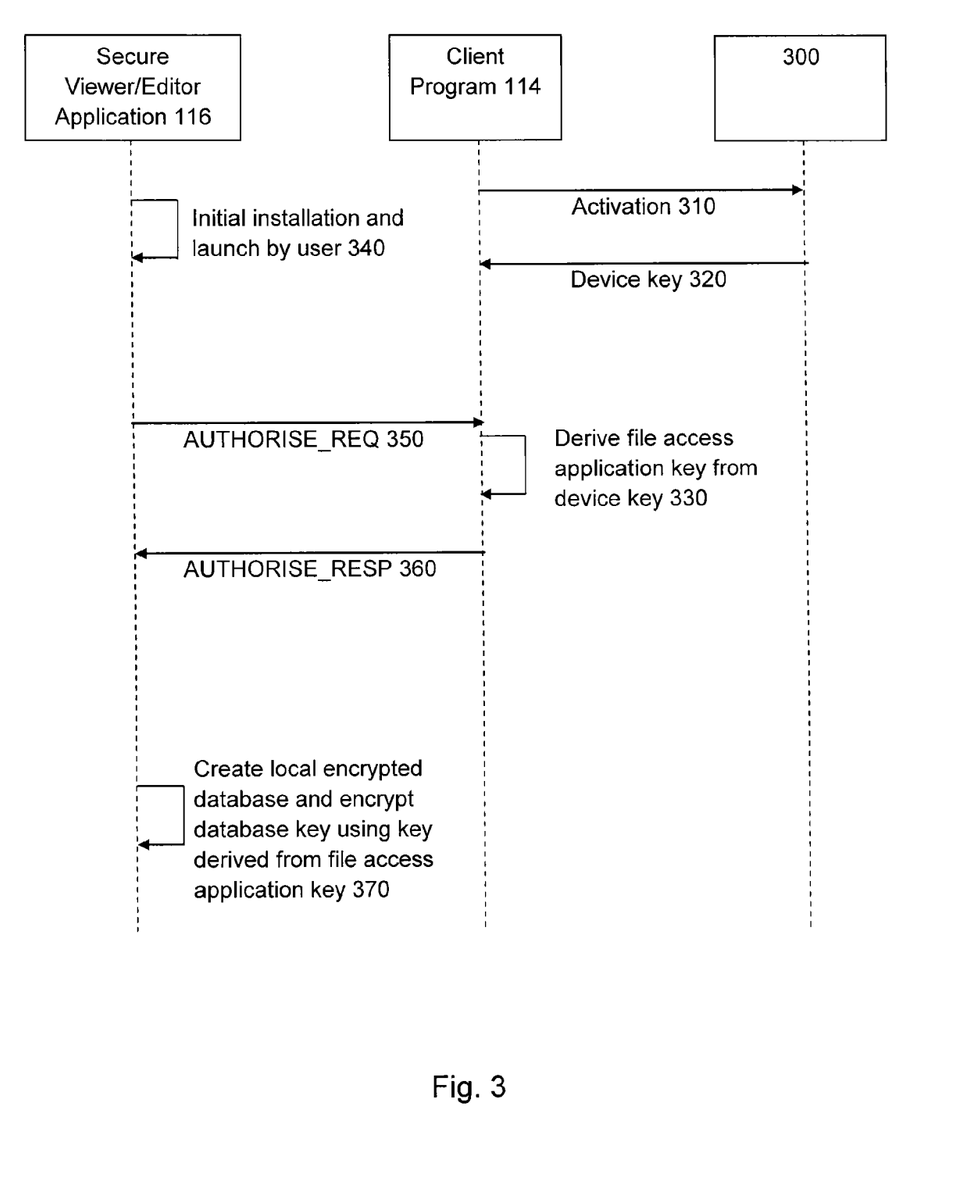
FIG. 3 shows schematically an example of the process of obtaining encryption keys and an initial pairing between a secure viewer/editor application and a client program.

One way to meet these requirements for the file access application key which is to be used by the secure viewer/editor application 116 is for the file access application key to be generated by the client program 114 from a combination of an application key that is specific to that client device 100 and/or the user of the client device 100 and an identifier of the particular secure viewer/editor application 116 concerned. Referring to FIG. 3, in a detailed specific example, this can be achieved as follows. The remote data store 300 (which may be the NOC 140 for example or some other server) stores a random 24-byte "User Secure Viewer/Editor Application Key" for each enterprise user ID making use of the service. For each activated device 100 associated with the enterprise user ID, that is a device 100 that has been activated following the device 100 sending an activation request 310 to the remote data store, a "Device Secure Viewer/Editor Application Key" 320 is derived from the User Secure Viewer/Editor Application Key. This derivation may be by for example some password-based cryptography technique. A suitable example is the PKCS #5 technique of the Public-Key Cryptography Standards. The derived Device Secure Viewer/Editor Application Key 320 is sent from the remote data store 300 to the client program 114 on the client device 100. The client program 114 then generates 330 the file access application key for each secure viewer/editor application 116 on the client device 100 from the received Device Secure Viewer/Editor Application Key 320 and using an identifier (such as a numerical identifier) corresponding uniquely to the respective secure viewer/editor applications 116 and sent to the client program 114, again using for example the PKCS #5 technique. This results in a unique file access application key for each secure viewer/editor application 116 on each client device 100. Importantly, knowledge of the User Secure Viewer/Editor Application Key stored at the remote data store 300 is sufficient to derive all such file access application keys. However, knowledge of the file access application key for one secure viewer/editor application 116 instance does not allow the file access application key for a different instance to be derived. This therefore provides for a secure file access application key which can be recovered from information stored remotely from the client device 100 and yet which does not reveal other file access application keys used for other secure viewer/editor applications 116 whether on the same or different client devices 100.

FIG. 3 also shows schematically initial installation and launch 340 of the secure viewer/editor application(s) 116 on the client device 100 by the user. Moreover, FIG. 3 also shows that in one embodiment, for an initial pairing between the secure viewer/editor application 116 and the client program 114, the secure viewer/editor application 116 and the client program 114 use commands (here the "AUTHORIZE_REQ" command 350 and "AUTHORIZE_RESP" command 360) to exchange a pair of elliptic curve points that are then used in an Elliptic Curve Diffie-Hellman key exchange calculation as discussed above. The client program 114 uses the response AUTHORIZE_RESP command 360 to send the Inter-container Transport key to the secure viewer/editor application 116 in encrypted form using the obtained shared encryption key. That Inter-container Transport key is then used to encrypt subsequent exchanges between the client program 114 and the secure viewer/editor application 116. Moreover, the client program 114 uses the response AUTHORIZE_RESP command 360 to send the file access application key to the secure viewer/editor application 116, which uses the file access application key to encrypt and decrypt as necessary the encrypted master key so that the secure viewer/editor application 116 can, in turn, then encrypt and decrypt 370 the relevant data that is stored on the client device 100. As noted above and discussed in more detail below, the encryption keys for encrypting exchanges from the client program 114 to the secure viewer/editor application 116 and vice versa may alternatively or additionally be public keys of public/private key pairs generated by the client program 114 and the secure viewer/editor application 116 respectively. As another example noted above, the encryption key may be a session key that is negotiated between the client program 114 and the secure viewer/editor application 116 during an initial handshake process, particularly in the case of the connection between the client program 114 and the secure viewer/editor application 116 being a TLS connection.

In an embodiment, the client program 114 supports sending of various actions and policies from some central control server to secure viewer/editor applications 116 and/or other applications and/or containers that store files or data on the client device 100 in secure form. Such a central control server may be for example one of the enterprise servers 160, 162, 164 and/or the NOC 140 or some other control server and manages the client device 100 and at least some of the applications and files that are stored on the client device 100. The central control center may for example want to amend certain access policies or the like for one or more of the applications or the files in the containers, or delete the application(s) or the containers or file(s) within them, perhaps because the client device 100 has been lost or stolen for example. Such actions and policies may therefore for example include wipe, lockout, cut/paste restriction policy, authentication timeout, hardware/OS compliance, etc. "Lockout" is a message that can be sent to the client device 100 to prevent access to the client device 100. "Wipe" is a message that can be sent to the client device 100 to cause wiping (i.e. deletion) of all data that is contained in containers. Restriction policies, such as cut/paste restrictions, etc., prevent the user copying, cutting, pasting, etc. data that has been made available to the user via the secure viewer/editor application 116. An "authentication timeout" is sent to each secure viewer/editor application 116 to indicate how much idle time they should allow to elapse before redoing the authentication exchange with the client program 114 (which will then re-prompt the user to enter a password). The client program 114 would not typically send password complexity/expiration/etc. policies to the secure viewer/editor applications 116 as setting of the password for each of the secure viewer/editor applications 116 is handled by the client program 114 itself, as discussed above.

In an example, the client program 114 can send policy messages encrypted with the relevant shared Inter-container Transport key for the secure viewer/editor application 116 or other application or container concerned, particularly if policy updates are "pushed" to the secure viewer/editor application 116 or other application or container concerned. Otherwise, policy messages can for example be encrypted using the shared secret key of a Diffie-Hellman key exchange as discussed above, particularly if the policy updates or messages are sent during the authentication stage. Again, alternatively or additionally, the encryption keys for encrypting such exchanges between the client program 114 and the secure viewer/editor application 116 may be public keys of public/private key pairs generated by the client program 114 and the secure viewer/editor application 116 respectively, and/or a session key negotiated between the applications as part of a TLS handshake process. The client program 114 can send action messages (e.g. wipe/lockout) to the secure viewer/editor application 116 or other application or data or file container concerned without using transport encryption as they contain no user-specific content that must be kept confidential and it must be possible for these messages to be sent and processed when either of the client program 114 and the secure viewer/editor application 116 or other application or container is in the locked state. After the secure viewer/editor application 116 or other application or container receives and processes such messages, it preferably sends an acknowledgement message to the client program 114, though this is optional. It will be noted that these action and policy messages are sent separately of any files that may be sent from the client program 114 to the secure viewer/editor application 116 or other application, the action and policy messages effectively being sent in a "side channel".

Figure 4:
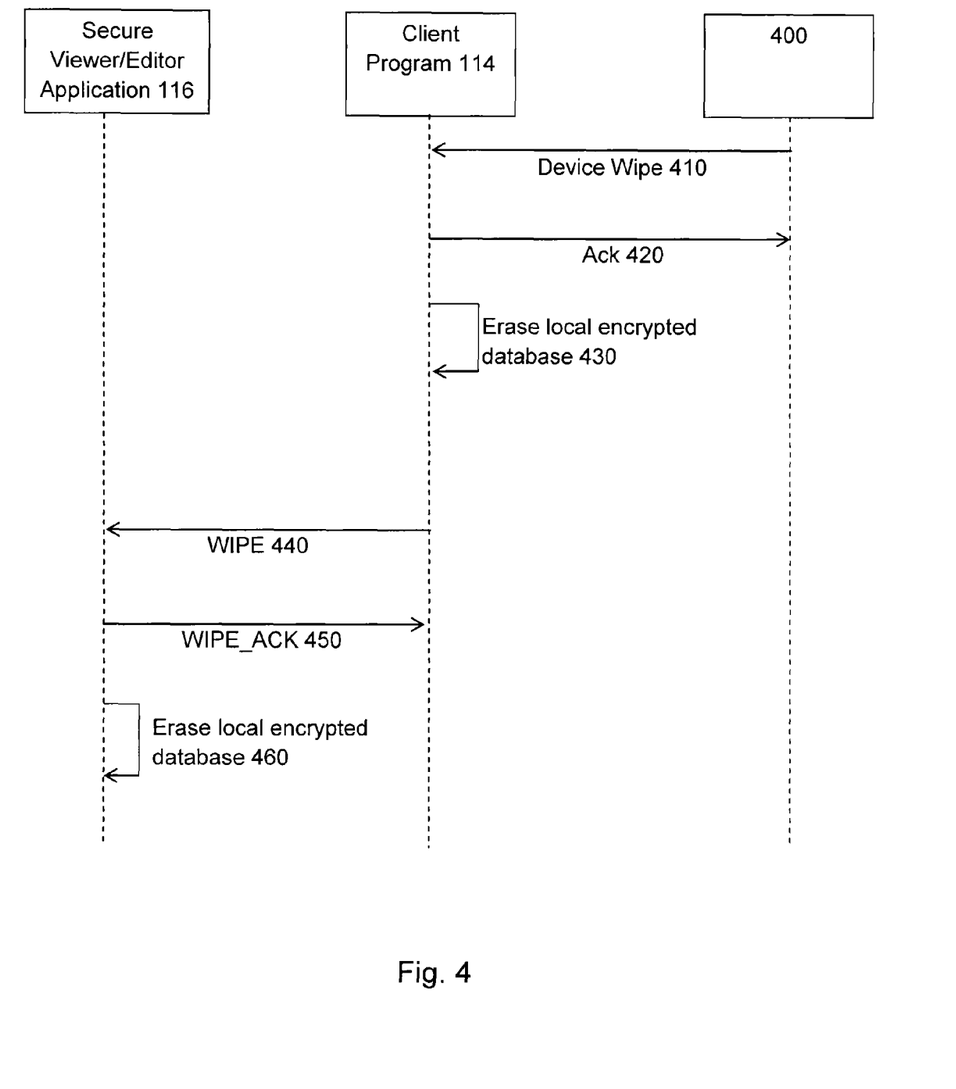
FIG. 4 shows schematically an example of sending of an action command from a central control server via a client program to a secure viewer/editor application.

An example of this is shown schematically in FIG. 4. The central control center 400 sends a Device Wipe command 410 to the client program 114 on the client device 100. The client program 114 responds with an acknowledgement ACK 420. The client program 114 erases 430 the corresponding local encrypted database that is accessible to the client program 114. The client program 114 also sends a corresponding Wipe command 440 to the corresponding secure viewer/editor application 116, which sends an acknowledgement ACK 450 in response. The secure viewer/editor application 116 also then erases 460 the corresponding local encrypted database associated with that secure viewer/editor application 116 and in accordance with the Wipe command.

Where the client program 114 is used in this way to proxy or deliver actions and policies from the central control server to secure viewer/editor applications 116 or other applications, it is preferred that none of the secure viewer/editor applications 116 and other applications has a direct connection to the central control server. Instead, it is preferred that the applications all delegate user authentication to the client program 114 and that the client program 114 alone proxies actions and policies to them during each such user authentication exchange. In this way, frequent communication between the client program 114 and the central control server is made more likely, helping to ensure a timely passing on of the actions and policies to the intended secure viewer/editor application(s) 116 or other application(s).

In order to securely send a file, for example from the client program 114 to the secure viewer/editor application 116 or vice versa, without transmitting or writing unencrypted information to a storage area (such as a hard disk or some other non-transitory storage) of the client device 100, the file in some embodiments is sent in a secure manner through an "internal" TCP (transmission control protocol) socket on the client device 100. This is particularly useful in the context of the APPLE® iOS operating system because of shortcomings of both NSURL (in particular memory limitations) and UIDocumentInteractionController (which is unable to use encrypted file names), these being processes that are normally used to allow user interaction with files on a device running iOS to be managed.

Figure 5:
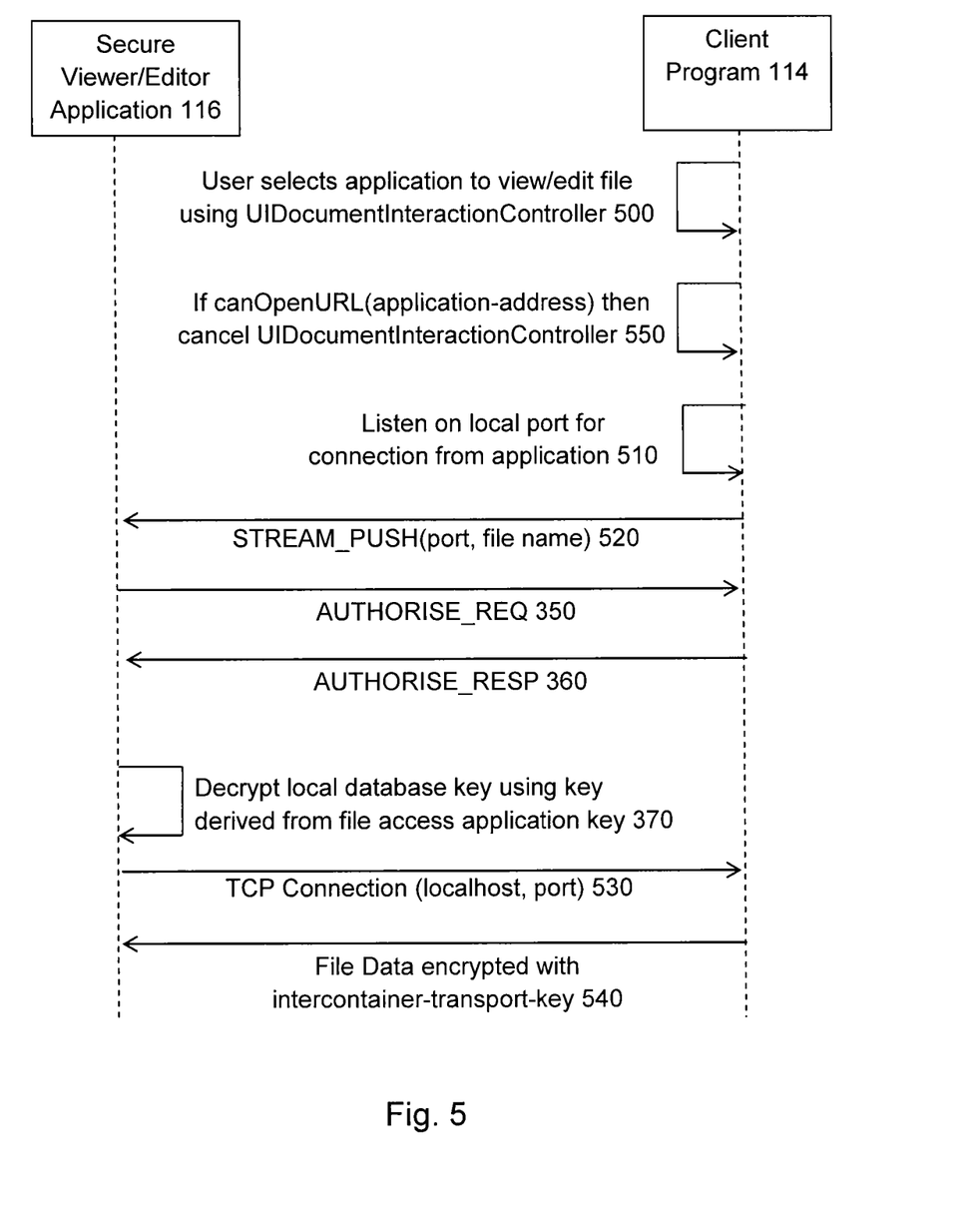
FIG. 5 shows schematically an example of sending of a file to a secure viewer/editor application.

Referring to FIG. 5, an example of an embodiment which achieves a secure socket transfer using a TCP socket in the context of the APPLE® iOS operating system operates as follows. The exchange starts with the user selecting 500 a file that needs to be sent (because the user wishes to access the file for example) and the destination for the file (for example, the secure viewer/editor application 116 that is to be used to view or edit the file). This file is stored on the client device 100 in encrypted form, which in general may be different from the encryption to which the secure viewer/editor application 116 has access. Once the user selects the file and the destination application, the sending application begins listening 510 on a TCP socket that is bound to the local IP address (e.g. 127.0.0.1) for a randomly selected port. The thread that is listening on the port will begin sending the encrypted file data as soon as the receiving secure viewer/editor application 116 connects to that local port. Meanwhile, the sending application assembles a STREAM_PUSH command URL that it will send 520 to the receiving secure viewer/editor application 116 using the iOS openURL command. The purpose of the STREAM_PUSH command is to alert the receiving the secure viewer/editor application 116 that it should connect to the local port to receive the (encrypted) file data. The STREAM_PUSH command contains the port number to connect to and the name of the file being sent, both encrypted using the Inter-container Transport key. However, it is not strictly necessary to encrypt the port number and in addition the file name could instead be sent with the file data over the TCP connection. The encryption IV (initialization vector) may be prepended to the file data that is sent over the TCP connection. The secure viewer/editor application 116 receives the message, and then connects to the client program 114 (in the background), on the given TCP port, and they establish a socket connection 530. The client program 114, still in the background, then, chunk by chunk, decrypts the file into memory, re-encrypts the file into a format that can be decrypted by the secure viewer/editor application 116, and sends that data 540 chunk through the socket to the secure viewer/editor application 116 which decrypts, re-encrypts, and writes the data. This method avoids unencrypted data being sent or written to disk in the client device 100.

The above secure socket transfer of files was discussed in the context of an example of where the client program 114 transfers a file to the secure viewer/editor application 116. The reverse process is in essence applied when the secure viewer/editor application 116 transfers a file to the client program 114. This may occur if for example the users wishes to send an email containing or having attached a file that has been viewed and/or edited using the secure viewer/editor application 116, or wishes to save such a file. The file is sent from the secure viewer/editor application 116 to the client program 114, which can then save the file and/or have it sent in or attached to an email, etc.

In a little more detail, in the context of the client device 100 running the APPLE® iOS operating system, a specific example of an embodiment of the present invention may operate as follows. First, in order to authenticate requests passed from the client program 114 to the secure viewer/editor application 116 as originating from the client program 114, and conversely, to authenticate requests passed from the secure viewer/editor application 116 to the client program 114 are originating from a supported secure viewer/editor application, the application bundleID passed as the "sourceApplication" parameter of each request is checked. The application "bundleID" of the sending process is sent to the receiving process by the host operating system when the sending process makes an "openURL" call for a URL for which the receiving process's application has registered to be a handler. These "bundleIDs" are guaranteed to be unique for APPLE® App Store$^{SM}$ supplied-applications. As only enterprise-supplied or App Store™ apps can be installed on a (non-jailbroken) iOS device, this information can be used as a form of authentication as to the application that is making a request. Then, to send files to a secure viewer/editor application 116, the client program 114 initially uses the iOS UIDocumentInteractionController to present the user with a list of applications that accept a particular attachment (based on file type). Every secure viewer/editor application 116, which support file viewing and/or editing, registers in the application's property list as a handler for the file extensions corresponding to the file types supported by the secure viewer/editor application 116. For example, to handle pdf files, a secure viewer/editor application 116 should register to handle files with the extension "pdf". For security reasons, the client program 114 implements the documentInteractionController:canPerformAction method of UIDocumentInteractionControllerDelegate in order to prevent the "copy" and "print" options from appearing in the "Open With" dialog. The UIDocumentInteractionController mechanism is also used to transfer large files from the secure viewer/editor application 116 to the client program 114. The client program 114 registers in its own application property list as a handler for a specific Uniform Type Identifier (UTI). This allows the secure viewer/editor application 116, after instantiating a UIDocumentInteractionController, to configure it to send files only to the client program 114, by setting the UTI of the controller to that specific UTI. It will still be necessary for the controller to display an "Open With" dialog, but the dialog will list only the client program 114 (since it is presumably the only application to support the specified UTI). openURL may be used for all non-file-transfer messages and to initiate TCP STREAM_PUSH communications discussed above. In addition, it may be noted that it is preferred not to allow the OS to send a file to a secure viewer/editor application 116 using the standard UIDocumentInteractionController mechanism. Instead, once the user selects the target application 116 for the file, a check is made to determine whether the target application 116 advertises support for a special URL that indicates that it is a secure viewer rather than a standard iOS file viewer. If so, then the UIDocumentInteractionController is cancelled 550 and the file is pushed to the selected application 116 using the local-TCP-connection/STREAM_PUSH mechanism 520 described above. FIG. 5 also shows the "AUTHORIZE_REQ" command 350 and "AUTHORIZE_RESP" command 360 and the encryption and decryption 370 of the relevant data that is stored on the client device 100 referred to above.

As noted above, as an alternative or in addition, the secure viewer/editor application 116 (or other application) and the client program 114 may each generate a public/private key pair, with the respective public keys being the shared encryption keys that are used to encrypt communications between the applications. For an initial pairing between the secure viewer/editor application 116 and the client program 114, each application sends a certificate containing its own public key to the other application. In some embodiments, the respective public keys are used as the shared encryption keys that are used to encrypt subsequent communications between the applications. In such embodiments, the sender of the communication preferably signs the message being sent with its private key. In other embodiments, all subsequent communication over TCP connections may be secured using TLS (Transport Layer Security). In such a case, the public/private key pairs are used respectively to encrypt/sign an initial handshake between the secure viewer/editor application 116 (or other application) and the client program 114 during which a symmetric "session" key is negotiated, that session key then being used for bulk encryption of data sent over the connection. In such cases, during subsequent communication between the secure viewer/editor application 116 and the client program 114, the application initiating the connection authenticates the application to which it is connecting by verifying that the certificate provided during an initial TLS handshake matches the certificate previously obtained from the other application. Likewise, the application accepting the incoming connection authenticates the application that is connecting to it by verifying that the client certificate provided during the TLS handshake matches the certificate previously obtained from the other application. In addition, the exchange of certificates may also enable the secure viewer/editor application 116 (or other application) and the client program 114 to determine whether they are authorized to interact with one another, for example by validating whether both certificates are signed by the same authority (e.g. the same enterprise). For example, a given enterprise may allow applications activated with the given enterprise to interact only with applications also activated against the same enterprise. If the certificates are signed by different enterprises, a policy of one enterprise or the other may be implemented to prevent the applications interacting. For a further discussion of this and related matters, reference may be made to our copending U.S. patent application No. 61/672,457 filed on Jul. 17, 2012, the entire content of which is incorporated herein by reference.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of operating a client device, the client device comprising a digital container comprising encrypted data, a data access application, and a control application, the method comprising:
    connecting the control application to a remote control center;
    receiving, at the control application, a command from the remote control center, the command specifying an action to be taken by at least one of: the data access application or the digital container;
    passing the command from the control application to at least one of: the data access application or the digital container; and
    carrying out the action specified by the command by at least one of: the data access application or the digital container, wherein the action specified by the command comprises at least one of: an action for prevention of access to data on the client device, a modification and/or addition of policy data relating to data security on the client device, and returning information relating to data security to the remote control center in response to a request.

2. The method according to claim 1, further comprising: the control application causing the data access application to execute in order to carry out the action specified by the command.

3. The method according to claim 1, wherein the data access application is unable to connect directly to the remote control server.

4. The method according to claim 1, wherein the command is encrypted using an encryption key.

5. The method according to claim 4, wherein the encryption key is one of: a shared secret key of a Diffie-Hellman key exchange, a public key of a public/private key pair sent by the control application to the data access application, or a symmetric session key negotiated between the control application and the data access application during an initial handshake.

6. The method according to claim 1, wherein the data access application is configured to enable at least one of: viewing, editing, manipulating, transforming, processing, storing or transmitting the data.

7. A client device comprising a digital container comprising encrypted data, a data access application, and a control application, the client device further comprising:
    a memory comprising executable computer program code;
    a processor in data communication with the memory and configured to execute the computer program code and cause the computing device to:
        connect the control application to a remote control center;
        receive, at the control application, a command from the remote control center, the command specifying an action to be taken by at least one of: a data access application or a digital container;
        pass the command from the control application to at least one of: the data access application or the digital container; and
        carry out the action specified by the command by at least one of: the data access application or the digital container, wherein the action specified by the command comprises at least one of: an action for prevention of access to data on the client device, a modification and/or addition of policy data relating to data security on the client device, and returning information relating to data security to the remote control center in response to a request.

8. The client device according to claim 7, wherein the processor is configured to execute the computer program code and further cause the client device to: cause the control application to cause the data access application to execute in order to carry out the action specified by the command.

9. The client device according to claim 7, wherein the data access application is unable to connect directly to the remote control server.

10. The client device according to claim 7, wherein the command is encrypted using an encryption key that is one of: a shared secret key of a Diffie-Hellman key exchange, a public key of a public/private key pair sent by the control application to the data access application, or a symmetric session key negotiated between the control application and the data access application during an initial handshake.

11. The client device according to claim 7, wherein the data access application is configured to enable at least one of: viewing, editing, manipulating, transforming, processing, storing or transmitting the data.

12. A non-transitory, computer-readable storage medium comprising executable computer program code that, when executed by a processor in a client device comprising a digital container comprising encrypted data, a data access application, and a control application, cause the client device to perform a method, the method comprising:
  connecting the control application to a remote control center;
  receiving, at the control application, a command from the remote control center, the command specifying an action to be taken by at least one of: the data access application or the digital container;
  passing the command from the control application to at least one of: the data access application or the digital container; and
  carrying out the action specified by the command by at least one of: the control application or the digital container, wherein the action specified by the command comprises at least one of: an action for prevention of access to data on the client device, a modification and/or addition of policy data relating to data security on the client device, and returning information relating to data security to the remote control center in response to a request.

13. The storage medium according to claim 12, wherein the method further comprises: the control application causing the data access application to execute in order to carry out the action specified by the command.

14. The storage medium according to claim 12, wherein the data access application is unable to connect directly to the remote control server.

15. The storage medium according to claim 12, wherein the command is encrypted using an encryption key that is one of: a shared secret key of a Diffie-Hellman key exchange, a public key of a public/private key pair sent by the control application to the data access application, or a symmetric session key negotiated between the control application and the data access application during an initial handshake.

16. The storage medium according to claim 12, wherein the data access application is configured to enable at least one of: viewing, editing, manipulating, transforming, processing, storing or transmitting the data.

* * * * *